US012636671B2

(12) United States Patent
Mock et al.

(10) Patent No.: US 12,636,671 B2
(45) Date of Patent: May 26, 2026

(54) DISPENSING SYSTEM AND A METHOD FOR ITS OPERATION, CLEANING UNIT AND DISPENSING UNIT

(71) Applicant: L'OREAL, Paris (FR)

(72) Inventors: Elmar Mock, Salvan (CH); Alexis Marette, Biel/Bienne (CH); Guillaume Decke, La Neuveville (CH)

(73) Assignee: L'OREAL, Paris (FR)

( * ) Notice: Subject to any disclaimer, the term of this patent is extended or adjusted under 35 U.S.C. 154(b) by 548 days.

(21) Appl. No.: 18/005,195

(22) PCT Filed: Jul. 13, 2021

(86) PCT No.: PCT/EP2021/069521
§ 371 (c)(1),
(2) Date: Jan. 12, 2023

(87) PCT Pub. No.: WO2022/013251
PCT Pub. Date: Jun. 20, 2022

(65) Prior Publication Data

US 2023/0311149 A1 Oct. 5, 2023

(30) Foreign Application Priority Data

Jul. 14, 2020 (CH) ........................................ 864/20

(51) Int. Cl.
*B05B 15/55* (2018.01)
*B05B 1/18* (2006.01)
(Continued)

(52) U.S. Cl.
CPC .............. *B05B 15/555* (2018.02); *B05B 1/18* (2013.01); *B05B 12/10* (2013.01);
(Continued)

(58) Field of Classification Search
CPC ......... B05B 15/555; B05B 1/18; B05B 12/10; B05B 12/1418; B05B 15/557;
(Continued)

(56) References Cited

U.S. PATENT DOCUMENTS 5,437,842 A * 8/1995 Jensen .................. B05B 12/122
422/62
9,079,204 B1 7/2015 Hattenbrun
(Continued)

FOREIGN PATENT DOCUMENTS

CN 203292123 U 11/2013
CN 104607331 A 5/2015
(Continued)

OTHER PUBLICATIONS

English translation of Chinese Office Action dated Aug. 23, 2025, Application No. 202180062624.4; 14 pages.

*Primary Examiner* — Qingzhang Zhou
(74) *Attorney, Agent, or Firm* — Rankin, Hill & Clark LLP

(57) ABSTRACT

A dispensing system for dispensing a fluid, the fluid being water or a water-based mixture, includes a dispensing unit and a cleaning unit. The dispensing unit includes a connection unit for connecting the dispensing unit to a supply of the fluid, a dispensing head for dispensing the fluid, and a flexible hose for guiding the fluid from the connection unit to the dispensing head. The cleaning unit includes a cleaning attachment unit for attaching the cleaning unit to the connection unit, a cleaning fluid delivery unit configured to deliver cleaning fluid to the dispensing unit via the cleaning attachment unit, and a receptacle unit configured to accommodate the dispensing head and to receive fluids exiting the dispensing head.

4 Claims, 4 Drawing Sheets

(51) Int. Cl.

| | |
|---|---|
| ***B05B 12/10*** | (2006.01) |
| ***B05B 12/14*** | (2006.01) |
| ***B05B 15/555*** | (2018.01) |
| ***B08B 9/032*** | (2006.01) |
| ***B08B 17/02*** | (2006.01) |
| ***E03C 1/046*** | (2006.01) |
| *B05B 12/12* | (2006.01) |

(52) U.S. Cl.
CPC ........ *B05B 12/1418* (2013.01); *B05B 15/557* (2018.02); *B08B 9/0326* (2013.01); *B08B 17/02* (2013.01); *E03C 1/046* (2013.01); *B05B 12/122* (2013.01); *B08B 9/0325* (2013.01)

(58) Field of Classification Search
CPC ..... B05B 12/122; B05B 12/006; B05B 12/02; B08B 9/0326; B08B 17/02; B08B 9/0325; B08B 9/027; E03C 1/046; E03C 1/0409; Y02B 30/52
See application file for complete search history.

(56) References Cited

U.S. PATENT DOCUMENTS

| | | | | |
|---|---|---|---|---|
| 2005/0051577 | A1* | 3/2005 | Loeb | B05B 7/30 222/145.6 |
| 2010/0126541 | A1 | 5/2010 | Schmon | |
| 2013/0214436 | A1* | 8/2013 | Mori | B01F 25/31242 261/19 |
| 2015/0298178 | A1* | 10/2015 | Hayakawa | B08B 9/027 134/22.1 |
| 2018/0071763 | A1 | 3/2018 | Croghan et al. | |

FOREIGN PATENT DOCUMENTS

| | | | | |
|---|---|---|---|---|
| JP | 2002-102843 | A | 4/2002 | |
| WO | 2016/193367 | A1 | 8/2016 | |
| WO | WO-2018122206 | A1 * | 7/2018 | A45D 19/16 |
| WO | 2020/070159 | A1 | 4/2020 | |

* cited by examiner

DISPENSING SYSTEM AND A METHOD FOR ITS OPERATION, CLEANING UNIT AND DISPENSING UNIT

BACKGROUND OF THE INVENTION

Field of the Invention

The invention relates to the field of sanitary installations. It relates to a dispensing system and a method for its operation, and a cleaning unit and a dispensing unit.

Description of Related Art

WO 2020/070159 A1 discloses a showerhead with one or more cartridges, each creating a spray of water by means of colliding water jets.

Typical issues arising in this context are fouling on the inside walls of the hose, and the accumulation of limescale inside the dispensing head and also on its outside, around the dispensing head's nozzles. Fouling typically is caused by the growth of a biofilm, that is, by bacterial growth. Fouling and limescale shall be referred to collectively as deposits.

JP2002102843 discloses a bathtub water passage sterilising/cleaning system with a steam generator, and an arrangement of valves for guiding steam through water supply conduits between a water tank and a bath water use terminal, in order to sterilize these conduits. When this is done, the steam is guided to a steam catching means instead of the bath water use terminal. In an embodiment, a pulsating steam, with fluctuating pressure and or debit and or temperature, is created in order to enhance the cleaning effect. According to other embodiments, a heat recovery means is provided, an arrangement of valves is provided to reverse the flow of steam in the conduit, an additional supply of cold water is provided in order to cool the conduit and valves in order to prevent damage by the hot stem, a heat pump unit is provided in order to recover exhaust heat from the bath water, or a fuel cell system is provided to generate heat for creating the steam.

WO2018122206 discloses a system to be used by hairdresser, including a showerhead that can be supplied with water mixed with treatment and washing additives, and a wash basin in which a treated person's hair is placed.

US2010126541 discloses a cleaning device for cleaning spray guns, particularly paint spray guns. The device has separate chambers for manually cleaning and drying a spray gun, and for storing fresh cleaning fluid and collecting used cleaning fluid.

U.S. Pat. No. 9,079,204 discloses a showerhead cleaning adapter connected to an inlet pipe to a showerhead. It can be manually operated to discharging cleaning solution into the showerhead.

US2018071763 discloses a container that can be suspended from a showerhead, allowing the showerhead to soak in cleaning solution.

SUMMARY OF THE INVENTION

It is an object of the invention to create a dispensing system and a method for its operation, and a cleaning unit and a dispensing unit of the type mentioned initially, which provide an improvement over the prior art.

A further possible object of the invention is to create a dispensing system and a method for its operation, and a cleaning unit and a dispensing unit that implement maintenance operations for maintaining the dispensing unit.

A further possible object of the invention is to create an integrated dispensing system including a dispensing unit and a cleaning unit that implements maintenance operations for maintaining the dispensing unit, and a corresponding method.

A further possible object of the invention is to create a dispensing system and a method for its operation for performing cleaning operations on objects other than the dispensing system itself.

A further possible object of the invention is to create a dispensing system and a method for its operation which allow to precisely and rapidly control the temperature of a liquid, in particular water, being dispensed.

A further possible object of the invention is to create a dispensing system and a method for its operation, for creating a mixture of a liquid, in particular water, with an additive.

One or more of these objects are achieved by a dispensing system and a method for its operation, and a cleaning unit and a dispensing unit according to the corresponding claims.

According to a first aspect, the cleaning attachment unit and connection unit are configured to be coupled to one another prior to operating the cleaning unit to perform maintenance operations for cleaning the dispensing unit, and for detaching the cleaning attachment unit from the connection unit afterwards. The coupling and detaching can be effected manually, without the use of tools.

According to the first aspect, the dispensing system for dispensing a fluid, the fluid being water or a water-based mixture, includes a dispensing unit and a cleaning unit, the dispensing unit including

- a connection unit for connecting the dispensing unit to a supply of the fluid,
- a dispensing head for dispensing the fluid;
- a conduit, in particular a flexible hose, for guiding the fluid from the connection unit to the dispensing head;

wherein the cleaning unit includes:

- a cleaning attachment unit for attaching the cleaning unit to the dispensing unit, in particular to the connection unit;
- a cleaning fluid delivery unit configured to deliver cleaning fluid to the dispensing unit via the cleaning attachment unit;
- a receptacle unit configured to accommodate the dispensing head and to receive fluids exiting the dispensing head.

According to a second aspect, the cleaning unit is permanently attached to the dispensing unit. Elements of the dispensing unit and elements of the cleaning unit in this case are parts of an integrated dispensing system.

According to the second aspect, the dispensing system for dispensing a fluid, the fluid being water or a water-based mixture, the system includes a dispensing unit and a cleaning unit, the dispensing unit including

- a connection unit for connecting the dispensing unit to a supply of the fluid,
- a dispensing head for dispensing the fluid;
- a conduit, in particular a flexible hose, for guiding the fluid from the connection unit to the dispensing head;

wherein the cleaning unit includes:

- a cleaning mixture preparation unit for providing a cleaning mixture to the connection unit;
- a cleaning fluid delivery unit configured to deliver cleaning fluid to the dispensing unit via the cleaning attachment unit;

optionally, a receptacle unit configured to accommodate the dispensing head and to receive fluids exiting the dispensing head.

According to both aspects, the dispensing system is configured to include a normal operating mode in which the fluid is dispensed through the dispensing head, and a maintenance operating mode, in which the cleaning fluid is dispensed through the dispensing head.

The following embodiments relate to at least the first and second aspect.

In embodiments, the cleaning unit, or the cleaning fluid delivery unit, includes:

means for providing the cleaning fluid to the conduit or hose, the cleaning fluid including steam or water or air or a mixture of two or more of steam and air and water and a cleaning agent.

In embodiments, the dispensing system includes a mixing unit or mixing valves for selecting from a flow of water from a water supply or from a flow of cleaning mixture, and/or for mixing the flow of water with the flow of cleaning mixture, and in particular wherein the mixing unit or mixing valves are part of the connection unit, or wherein the mixing unit or mixing valves are part of the cleaning attachment unit and water from the water mixer is guided from the connection unit into the cleaning attachment unit.

In a cleaning mode, the flow of cleaning mixture or the mixture of water with the cleaning mixture, collectively referred to as cleaning fluid, is supplied to the hose and the dispensing head.

In embodiments, the connection unit allows simply for switching between the flow of water from the water supply and the flow of cleaning mixture.

In embodiments in which the mixing unit or mixing valves are part of the cleaning attachment unit, a water supply conduit can be arranged to provide water from the cleaning attachment unit to the cleaning fluid delivery unit for generating steam, and/or a boiler for generating hot water.

In embodiments, the cleaning unit comprises, for providing the cleaning mixture, a second mixer, in particular a venturi injector, for admixing a cleaning pre-mix, to a flow of steam, thereby creating the cleaning mixture.

In embodiments, the cleaning unit includes, for providing the cleaning pre-mix, a third mixer, in particular a mixing chamber, for admixing air, to a flow of cleaning water, thereby creating the cleaning pre-mix.

In embodiments, the cleaning unit comprises, for providing the cleaning water, a fourth mixer, in particular an additive mixer, for admixing a cleaning agent to a flow of water, thereby creating the cleaning water.

In embodiments, a check valve is arranged in the flow of cleaning pre-mix to the second mixer or venturi injector, in particular after the third mixer or mixing chamber.

In embodiments, a control valve or a water pump is arranged to provide the cleaning water to the mixing chamber.

In embodiments, a water pump is arranged to provide the cleaning water to the mixing chamber, the water pump being a positive displacement pump, such as a peristaltic pump.

In embodiments, a controlled valve or a static valve is arranged to provide air, in particular ambient air, to the mixing chamber.

In embodiments, the dispensing system includes a safety shutoff valve arranged in a steam supply conduit.

In embodiments, the dispensing system is configured for delivering the cleaning fluid to the conduit or hose and dispensing head in the form of one or more of:

steam;

a mixture of steam, air and water;

a mixture including a cleaning agent, in particular wherein the cleaning agent is provided as part of a mixture of the cleaning agent with water and optionally air, and in particular wherein this mixture is admixed to a flow of steam;

a pulsed manner;

a sequence of steam and of a mixture as described above, in particular in a periodically repeated sequence;

a sequence of fluids at different temperatures, in particular in a periodically repeated sequence;

a mixture including a foaming agent, such as a hydrogen carbonate, or oil in combination with steam;

a mixture including a treatment agent that remains attached on inside surfaces of the dispensing unit, in particular for preventing accumulation of deposits on these surfaces.

By selecting a ratio in which air and steam and water are mixed, a turbulent flow can be generated, the turbulence assisting in removal of deposits. With a relatively low proportion of water to steam, a sputtering flow, that is, a flow of steam with intermittent droplets or spattering of water can be generated. This too allows for an improved removal of deposits.

Alternating hot and cold fluids cause thermal stress in calcified regions, aiding in their break-up and removal. Temperatures can be, for example, be determined by the fluids being water at the temperature provided by the mains supply, and steam.

In embodiments, the dispensing system is configured for delivering the cleaning fluid to the conduit or hose and dispensing head in the form of hot water, in particular hotter than 70°, under mains pressure or under an elevated pressure, for heating these elements for sterilising these elements.

In embodiments, the dispensing system is configured for delivering the cleaning fluid in the form of steam, with periodic pulses of water, optionally with further fluid components, being added and being driven through the dispensing unit by the pressure of the steam.

The steam pressure will accelerate the relatively small mass of water in each pulse, increasing its kinetic energy, by which it can provide a mechanical shock aiding in the removal of deposits.

In embodiments, the dispensing system is configured for adding, as a further component, an agent with a lower boiling temperature than water.

This causes, when the agent after entering the flow of steam is heated by the steam, the agent to evaporate and increase the pressure of the fluid, further accelerating the flow and increasing its impact on deposits.

In embodiments, the dispensing system is configured to switch between different forms of delivering the cleaning fluid, in particular being configured to supply a cleaning fluid including a cleaning agent and/or a foaming agent, letting it react with deposits in the hose and dispensing head, and then rinsing the hose and dispensing head, in particular with water or steam.

In embodiments, the dispensing system is configured to apply different cleaning cycles to the same dispensing unit over time, with cleaning cycles of a first type being applied at shorter time intervals, and cleaning cycles of a second type being applied at longer time intervals, in particular wherein the cleaning cycles of the first type are less intensive, for example involving the application of steam only, and wherein the cleaning cycles of the second type are more intensive, for example involving the application of a cleaning agent.

In embodiments, the shorter intervals can be daily, whereas the longer intervals are weekly. In embodiments, the longer intervals are more than five times longer than the short intervals.

In embodiments, the receptacle unit includes a coolant storing element for storing a coolant fluid, arranged to cool a dispensing head placed in the receptacle unit;

in particular wherein the coolant storing element includes an open pored sponge for retaining cooling water.

In embodiments, the receptacle unit includes a heat absorbing element, for absorbing heat from cleaning fluid exiting the dispensing head placed in the receptacle unit;

in particular wherein the heat absorbing element includes an open pored sponge of a heat absorbing material, in particular of a metal or ceramic material.

In embodiments, the receptacle unit includes one or more of guiding elements for guiding jets of cleaning fluid that exit the nozzles back against the outlet in regions around the nozzles, for cleaning these regions;

separate cleaning elements for cleaning the outlet in regions around the nozzles, in particular nozzles for spraying cleaning fluid, or mechanical cleaning elements such as brushes.

In embodiments, the receptacle unit includes gaskets preventing a flow of cleaning fluids exiting the dispensing head from reaching the outer surface of the dispensing head. Thereby the dispensing head is protected against hot and/or aggressive cleaning fluids.

In embodiments, the receptacle unit includes a detector of a presence of a dispensing head in the receptacle unit, the dispensing system being configured to apply a cleaning cycle only if a dispensing head is placed in the receptacle unit.

The following embodiments do not relate to the second aspect.

In embodiments, the connection unit, when not connected to the cleaning attachment unit, or not powered by the cleaning attachment unit, automatically allows only water from a/the water supply to be provided to the dispensing head.

This realises a fail-safe mode preventing hot cleaning mixture being supplied to the dispensing head in the event of a failure in the powering of the connection unit.

In embodiments, the cleaning attachment unit includes motors for driving the mixing unit or mixing valves in the connection unit, and force transmitting elements interacting with force receiving elements of the connection unit for transmitting drive forces to the mixing unit or mixing valves.

The force transmitting and receiving elements can be, for example, a positive locking transmission or magnetically coupled elements. They realise a mechanical interface for driving the mixing unit or mixing valves.

In embodiments, the connection unit includes an electrically controlled mixing unit or electrically controlled mixing valves, and the connection unit and cleaning attachment unit include electrical connectors to drive the electrically controlled mixing unit or mixing valve valves in the connection unit.

This realises an electrical interface for driving the mixing unit or mixing valves.

The following embodiments relate to at least the first and second aspect.

In embodiments, the dispensing system is configured to emit a warning signal prior to and/or while in the operating mode in which the dispensing head, being arranged outside of the receptacle unit, is supplied with cleaning fluid.

In this manner, a user is warned that the dispensing system is in a mode in which potentially harmful cleaning fluid is dispensed, as opposed to normal operation of the dispensing unit. The warning signal can be one or more of an optical signal and an acoustical signal. The warning signal can be activated by the controller, or it can be activated by the temperature of the fluid in the dispensing unit, for example by including a thermochromic substance.

In embodiments, the dispensing system is configured, in a water temperature control mode, to dispense water through the dispensing head and to control the temperature of the water by adjusting an amount of steam added to the water.

This temperature control can in particular be applied in embodiments in which the dispensing unit and cleaning unit are integrated units of the dispensing system.

In embodiments, the dispensing system includes a temperature sensor arranged to measure the temperature of the water after the steam is admixed, and is configured to vary the amount of steam added in order for the temperature of the water to reach a set point temperature.

The water can be pre-heated to a temperature that is below the set point temperature, such that only the difference in energy from the set point temperature needs to be supplied by the added steam. Due to the high energy content of the steam and the physical proximity of the point of admixing to the water, the water temperature can be made to quickly follow the set point.

This allows to quasi immediately provide a stream of water at a desired temperature, and for quickly changing the temperature of the delivered water, as compared to adjusting the temperature by varying the mixture of hot and cold water from a mains supply or water tank or boiler.

The following embodiments do not relate to the second aspect.

In embodiments, the dispensing system includes elements implementing wireless communication between the connection unit and the cleaning attachment unit.

In embodiments, the wireless communication is by means of an RFID tag arranged in the connection unit and an RFID detector arranged in the cleaning attachment unit, or a near field communication link between the connection unit and the cleaning attachment unit, and the cleaning unit is configured to determine an identity of the connection unit by means of wireless communication.

In embodiments, the cleaning unit is configured to determine an identity of the connection unit by means of an optical reader of the cleaning attachment unit reading a visual code on the connection unit.

The following embodiments relate to at least the first and second aspect.

In embodiments, the cleaning unit is configured to transmit and/or store cleaning data related to cleaning operations of the cleaning unit, in association with an identity of the connection unit.

The identity is a unique identifier, such as a serial number, network address etc. The cleaning data can include one or more of date and time, duration and type of cleaning cycles applied to the dispensing unit of which the identified connection unit is part. The cleaning data, and other data associated with the connection unit or generally the dispensing unit, can be uploaded to a remote server system. The remote server system can be distributed or cloud-based. The data can be used for planning maintenance operations, the supply of consumables and the like.

In embodiments, the dispensing unit is configured to record and store usage data representing usage of the dispensing unit during its normal operation, and the cleaning unit being configured to read out the usage data from the dispensing unit.

The usage data can include one or more of dates and times of operation, amount of water consumed, water temperature.

This allows the cleaning unit to be used to collect data from the dispensing unit by means of an energy efficient near field data transmission protocol that relies on close physical proximity, as opposed to, for example, a WiFi protocol. This in turn allows to equip the dispensing unit with small and long-lasting batteries, or no batteries at all.

In embodiments, the dispensing unit is configured to receive and store data representing at least one of cleaning data and dispensing unit operating parameters from the cleaning unit. The cleaning data can include at least a date of a most recent cleaning operation. The dispensing unit operating parameters can be used to control operation of the dispensing unit.

In embodiments, the cleaning unit is configured to retransmit the usage data to a remote data collection unit by means of a further wireless communication protocol, in particular by means of a WiFi or Bluetooth protocol.

It thus is not necessary for each connection unit to be reachable by WiFi: reading the usage data is done at close proximity by the cleaning attachment unit, and at another time, when the cleaning unit is in a location reachable by the further wireless communication protocol, the usage data can be forwarded to the data collection unit.

In embodiments, the dispensing system is configured to perform the steps of:

- filling at least part of the receptacle unit, via the conduit or hose or via a separate cooling water conduit, with cooling water;
- delivering a hot cleaning fluid for cleaning the dispensing head, the hot cleaning fluid for example including steam or hot water;
- optionally replacing the cooling water warmed up by the hot cleaning fluid with fresh cooling water.

In embodiments, the dispensing system is configured to perform the steps of, after a cleaning cycle for cleaning the dispensing unit,

- rinsing the receptacle unit by at least one of rinsing the heat absorbing element with rinsing fluid provided through the hose, and
- rinsing the coolant storing element with rinsing fluid provided through the cooling water conduit.

In both cases, the rinsing fluid can be water or steam, optionally including cleaning and/or treatment agents. After exiting from the receptacle unit, the rinsing fluid can be outlet into a sink, or collected in a wastewater tank of the cleaning unit.

In embodiments, the receptacle unit includes at least one vibration generator for generating vibrations, in particular ultrasound vibrations, for removing deposits from a dispensing head placed in the receptacle unit.

In embodiments, the vibration generator is arranged to transmit vibrations to deposits through water in the dispensing head.

This can be used to induce cavitation in the water, thereby creating pressure shocks aiding in removal of deposits.

In embodiments, at least one vibration generator is arranged to be in contact with an outer shell of the dispensing head when the dispensing head is arranged in the receptacle unit in a position for cleaning.

In embodiments, the dispensing head includes an outer shell and an inner conduit, and at least one vibration transmitter is arranged to transmit vibrations generated by the vibration generator from the outer shell to the inner conduit.

In embodiments, the vibration transmitter is a section of material connecting the outer shell to the inner conduit, in particular at a location corresponding to, or near to, a location of deposits inside the inner conduit, and corresponding to, or near to, a location of the vibration generator when the dispensing head is placed in the receptacle unit. Thereby the vibration transmitter forms a bridge, transmitting vibrations to the location of deposits, in particular via a shortest path through the dispensing head.

In embodiments, at least one vibration generator is arranged to transmit vibrations to a region around nozzles of the dispensing head, in particular by the at least one vibration generator being arranged outside the dispensing head, facing the nozzles.

In embodiments, the inner conduit and its connections to the outer shell are arranged to have nodes of oscillation of the inner conduit, when made to vibrate by the vibration transmitter, and at a selected frequency of the vibration transmitter, at locations where deposits are prone to accumulate.

In embodiments, the receptacle unit is part of or attached to the cleaning fluid delivery unit, and in particular wherein the cleaning fluid delivery unit is arranged to collect used cleaning fluid.

In embodiments, the receptacle unit includes an outlet by which used cleaning fluid and/or cooling water can be drained from the receptacle unit. It can be drained into a bathtub, shower or sink at which the dispensing unit is installed.

In embodiments, the mixing unit is one of:

- a mixing cartridge with one degree of freedom, allowing to set a relative amount of water and cleaning mixture; or
- a mixing cartridge with two degrees of freedom, allowing to set a relative and a total amount of water and cleaning mixture.

In embodiments, the mixing unit is a ceramic mixing cartridge. In other embodiments, two or more mixing valves, in particular ceramic valves, are present in place of the mixing unit.

In embodiments, the dispensing system is configured for the cleaning unit to deliver water for cooling the receptacle unit through the dispensing head.

In embodiments, the cleaning unit includes a cooling water conduit for delivering water for cooling the receptacle unit, the cooling water conduit being separate from and not identical to the conduit or hose.

In embodiments, the cleaning unit includes an additional cleaning fluid conduit for delivering cleaning fluid to the receptacle unit for cleaning the dispensing head, in particular a region around nozzles of the dispensing head.

In embodiments, the cleaning unit includes a water supply conduit for delivering fresh water from the cleaning attachment unit to the cleaning fluid delivery unit In embodiments, cleaning unit includes an operating mode in which the dispensing head, when arranged outside of the receptacle unit, is supplied with cleaning fluid.

In this manner, the cleaning unit in combination with the hose and dispensing head can be used to clean other objects near the dispensing unit. In particular, the cleaning fluid can be steam, thus allowing to sterilise such other objects. Such other objects typically are part of a sanitary installation, such as a shower, bathtub, washbasin, toilet bowl, etc.

In embodiments, the cleaning unit includes a separate outlet for applying steam to objects other than the dispensing unit, in particular an outlet provided by cleaning fluid from the cleaning fluid delivery unit through a separate conduit.

According to a third aspect of the invention, a dispensing system includes a dispensing unit and a steam generating unit, and is configured to dispense water through the dispensing head and to control the temperature of the water by adjusting an amount of steam added to the water.

The dispensing system for dispensing a fluid in a sanitary or body care device, the fluid being water or a water-based mixture, includes:

- a dispensing unit including a dispensing head for dispensing the fluid and a conduit, in particular a flexible hose, for guiding the fluid to the dispensing head;
- a steam generating unit;
- a mixer for admixing steam supplied by the steam generating unit to a an optionally pre-heated water or water-based mixture and providing the resulting mixture to the conduit or hose;
- the dispensing system being configured to control the temperature of the resulting mixture by adjusting an amount of steam added to the water.

A dispensing system of this type can be part of a hairdresser sink and shower arrangement, or a system in a medical setting.

A cleaning unit for use in the dispensing system includes:

- a cleaning attachment unit for attaching the cleaning unit to the dispensing unit, in particular to the connection unit;
- a cleaning fluid delivery unit configured to deliver cleaning fluid to the dispensing unit via the cleaning attachment unit;
- a receptacle unit configured to accommodate the dispensing head and to receive fluids exiting the dispensing head.

A connection unit for use in a dispensing system includes:

- an inlet for a flow of a fluid, in particular water, an inlet for a flow of a cleaning mixture (CM), and an outlet for a mixture of the fluid and cleaning mixture;
- a mixing unit or at least two mixing valves controlling admixing of the flow of cleaning mixture (CM) to the flow of the fluid (W);
- an electrical or mechanical interface for driving the mixing unit or mixing valves.

In embodiments, the connection unit of claim is configured to, when not connected to the cleaning attachment unit, or not powered by the cleaning attachment unit, automatically allow only water from a/the water supply to be provided to the dispensing head.

In embodiments, the connection unit includes biasing elements that, when the connection unit is not powered, bring the mixing unit or mixing valves to a state in which the flow of cleaning mixture (CM) to the outlet is blocked, and the flow of the water (W) to the outlet is free.

In embodiments, the connection unit includes an element for wireless communication with a cleaning attachment unit configured to be connected to the connection unit,

- or an element for identification of the connection unit by such a cleaning attachment unit, in particular wherein this element is an RFID tag identifying the connection unit or an optical code identifying the connection unit.

A method for operating the dispensing system comprises, for performing maintenance operations on the dispensing unit, the steps of one or more of:

- sterilising the dispensing unit;
- decalcifying the dispensing unit; and
- preventive treatment of the dispensing unit.

In embodiments, at least two sterilising and at least two decalcifying operations are performed alternating, followed by a final treatment operation.

In embodiments, a maintenance program defining a sequence of maintenance operations can be programmed by user with higher level privileges, such as a manager, a technical expert, a computer system configured to optimise operation, etc. Programs can be modified wireless or directly on the cleaning unit. Users with lower-level privileges can be able to select from a choice of non-modifiable maintenance programs. In embodiments, a maintenance program is automatically selected according to the identity of the dispensing unit.

A method for operating the dispensing system, wherein the dispensing system includes an operating mode for performing cleaning operations on objects other than the dispensing system itself, the method including one or more of the steps of:

- when the dispensing system is in said operating mode, emitting a warning signal;
- operating a presence detecting unit, and, if the presence of a person in a treatment location is detected by the presence detecting unit, preventing operation of the dispensing system in said operating mode.

According to a fourth aspect of the invention, a method is provided to create a mixture of a fluid with an additive.

The method for creating a mixture of a liquid with an additive comprises, for admixing of the additive in a flow of liquid, in particular of water, the steps of:

- creating a vaporised mixture including of evaporated fluid and the evaporated additive;
- injecting the vaporised mixture in the flow of liquid;
- letting the vaporised mixture condense in the liquid, thereby creating the mixture of the liquid with the additive.

Since the evaporated additive, as part of the vaporised mixture, has a relatively large volume compared to its liquid state, the absolute amount of additive can be controlled much more exactly by controlling the flow of the vaporised mixture than would be the case when controlling the flow of additive in its liquid state.

Furthermore, because of the abovementioned relatively large volume of the evaporated additive, after injection in the flow of liquid, the additive is strongly diluted. It thus is possible to provide the additive in highly concentrated form. The additive can be produced and transported to the point of use without the addition of inactive filler materials. This reduces manufacturing costs, transport costs and either the size of additive containers at the point of use, or time intervals for refilling such containers.

The additives can be for cosmetic or hair care applications, or for medical application, treatment of plants and for technical applications. In each type of application, a highly concentrated additive is used, and a strongly diluted but precisely controlled mixture, in particular an emulsion, is created and immediately applied at a point of use.

In embodiments, the method includes the step of dispensing the mixture of the liquid with the additive to a point of application.

The dispensing system can be a shower in a bathroom or combined with a sink, and is for use to wash or shower the human body, and/or for cosmetic or hair care applications, for example for use by professional hairdressers.

In other applications, the dispensing system and corresponding methods are implemented in combination with devices for medical applications in which fluids are delivered for use on humans or animals, through conduits that are prone to deposits forming, and/or in which further devices need to be regularly sterilised. This is particularly the case for devices that do not fit in an autoclave, such as tracheoscopic or similar devices. In a medical setting, the dispensing system and corresponding methods can also be used to, in a normal operating mode as opposed to a cleaning or maintenance operating mode, admix additives to a flow of liquid prior to application at a point of use.

The different aspects can be implemented separately or in combination. In particular, the third and fourth aspect can be implemented in combination with the first aspect or the second aspect.

Further embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to exemplary embodiments which are illustrated in the attached drawings, in which.

DETAILED DESCRIPTION OF THE INVENTION

In principle, identical or functionally identical parts are provided with the same reference symbols in the figures.

Figure 1:
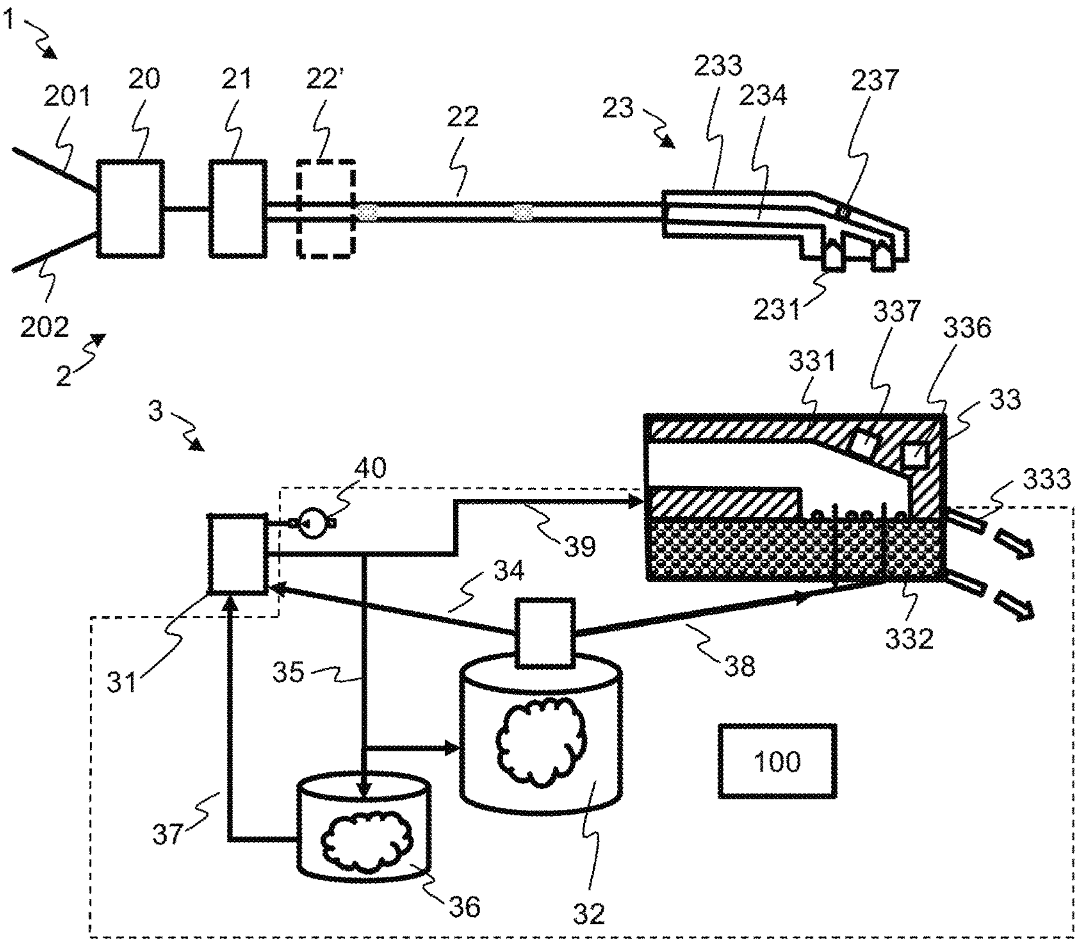
FIG. 1 schematically shows a dispensing system with a dispensing unit and a cleaning unit in a separated state.
Figure 2:
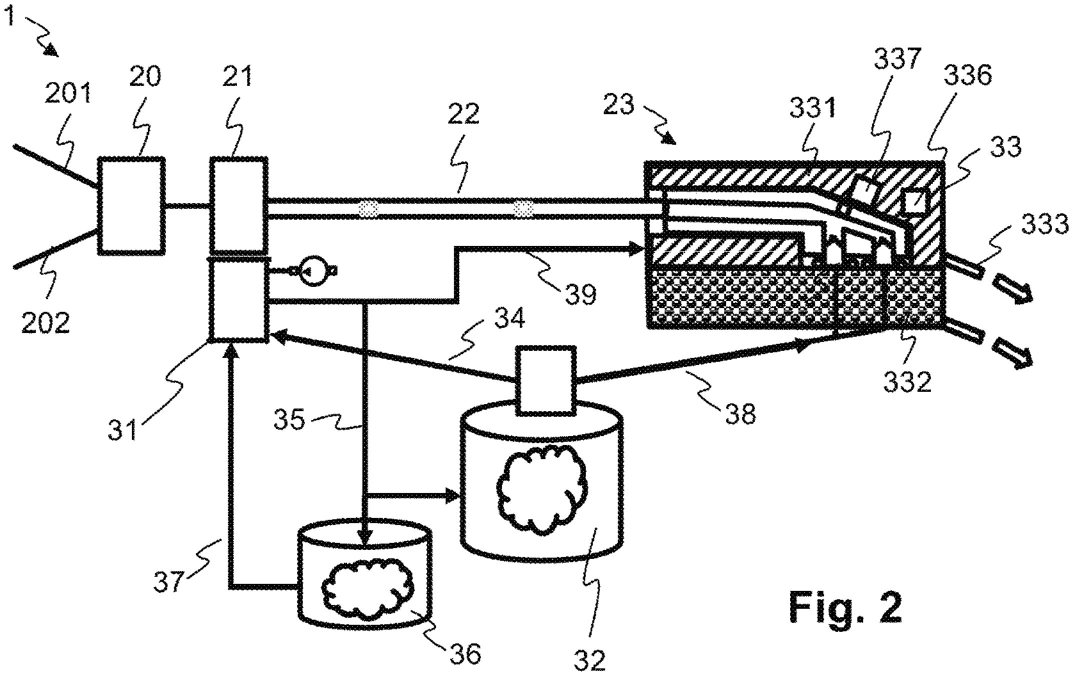
FIG. 2 the same, in a state combined for cleaning the dispensing unit.

FIG. 1 shows a dispensing system 1 with a dispensing unit 2 and a cleaning unit 3 in a separated state, and FIG. 2 shows them in a combined state, for cleaning the dispensing unit 2.

The dispensing system 1 includes commonly present elements of, for example, a shower in a bathroom, for use to wash or shower the human body, or for cosmetic or hair care applications, or for medical treatment. Such elements are a cold water supply 201 and hot water supply 202 feeding into a water mixer 20. The water mixer 20 serves to control a water flow and temperature and can include manually operated valves or a manually operated mixing cartridge, usually a ceramic cartridge. A hose 22, or more generally, a conduit, is arranged to guide the water from the water mixer 20 to a dispensing head 23. Optionally, further devices 22' can be part of the dispensing unit 2, such as units for filtering and/or heating and/or for admixing further additives, such as soap, colorants, detergents, cosmetic or body treatment products etc. The cleaning unit 3 serves to clean the dispensing head 23, hose 22 and, if they are present, the further device or devices 22'.

The dispensing head 23 can be a standard dispensing head, or include an outer shell 233 holding an inner conduit 234 guiding the water to outlet cartridges 231 for spraying the water. The dispensing head 23 can be a showerhead as disclosed in the initially mentioned WO 2020/070159 A1.

In addition to commonly known elements, the dispensing unit 2 includes a connection unit 21 that is connected on an intake side to the outlet of the water mixer 20, and at an outlet side to the hose 22. In normal operation of the dispensing unit 2, the connection unit 21 passes the water from the intake side to the outlet side. A user can control the water flow and temperature by means of the water mixer 20. Thus, the only change to an existing installation can be the addition of the connection unit 21. In embodiments, the water mixer 20 and connection unit 21 are a single, integrated unit. This integrated unit can be installed in place of a conventional water mixer 20. It can be integrated in a wall or attached to a wall, or integrated in a device for body or hair treatment. Such a device in turn can be integrated in a hairdresser's chair.

The cleaning unit 3 includes a cleaning fluid delivery unit 32 with a cleaning fluid conduit 34 for delivering a cleaning fluid, or a component of a cleaning fluid, to a cleaning attachment unit 31. Typically, the cleaning fluid delivery unit 32 delivers a component of the cleaning fluid, such as steam, in which case the cleaning fluid delivery unit 32 is a steam generator. The cleaning attachment unit 31 and connection unit 21 are arranged for guiding the fluid from the cleaning fluid conduit 34 into the connection unit 21 and into the hose 22 and dispensing head 23. In embodiments, the cleaning attachment unit 31 is configured to add further fluids.

The connection unit 21 can be configured to switch between delivery of the cleaning fluid and water from the water mixer 20 to the hose 22, or to mix the cleaning fluid with water from the water mixer 20. For this, the connection unit 21 includes mixing valves 212 or a mixing unit 211 powered from the cleaning attachment unit 31.

In other embodiments, the mixing valves 212 or the mixing unit 211 are part of the cleaning attachment unit 31, and the water from the water mixer 20 is guided to the cleaning attachment unit 31 via the connection unit 21 when they are coupled to one another.

Figure 3:
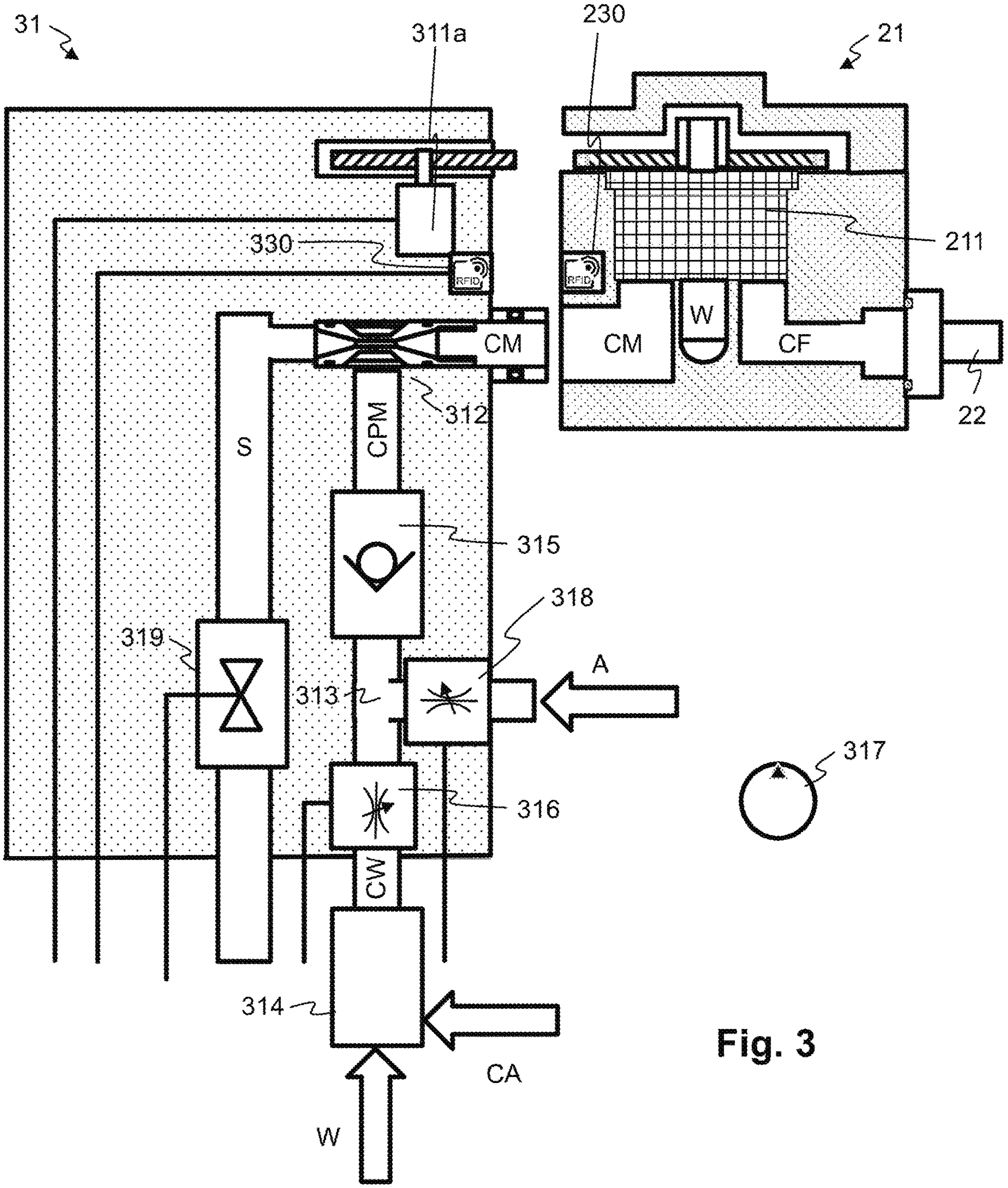
FIG. 3 details of a connection unit of the dispensing unit and a cleaning attachment unit of the cleaning unit.

The cleaning attachment unit 31, in the embodiment shown in more detail in FIG. 3, is configured to provide the cleaning fluid to the connection unit 21. The cleaning fluid is provided in the cleaning attachment unit 31 as steam from the cleaning fluid delivery unit 32, as water, or as a mixture of such steam with further components, such as water, hot water, air and cleaning and/or foaming agents. Air can be provided through an air inlet pump 40, shown in FIGS. 1 and 2, or through a valve, shown in FIG. 3.

In embodiments, the cleaning attachment unit 31 can add hot water delivered from a boiler 36 via a hot water conduit 37 to the cleaning fluid, or provide the entire flow of cleaning fluid by this hot water.

In embodiments, a water supply conduit 35 can be arranged to provide water from the cleaning attachment unit 31 to the cleaning fluid delivery unit 32 and/or the boiler 36. In this case, the cleaning attachment unit 31 is arranged to be supplied with water from the connection unit 21. If no water supply conduit 35 is present, then water containers in the cleaning fluid delivery unit 32 and/or boiler 36 can be filled manually.

The cleaning unit 3 includes a receptacle unit 33 in which the dispensing head 23 can be placed for cleaning. A presence detector 336 detects whether the dispensing head 23 is present.

In embodiments, the receptacle unit 33 includes a volume with a coolant storing element 331, surrounding the dispensing head 23. The coolant storing element 331 is an open pored material and can be filled with cooling water supplied by a cooling water conduit 39 from the cleaning attachment unit 31. Cooling the outside of the dispensing head 23 in this manner prevents it from being damaged by hot cleaning fluid. One or more outlets 333 can be present, for removal of the cooling fluid. Flow through the outlet can be controlled by an active valve, or by the valve being a relief valve, or by the height of the valve relative to the volume of the coolant storing element 331.

In embodiments, the receptacle unit 33 includes a heat absorbing element 332 in a volume for collecting cleaning fluid exiting the dispensing head 23. The heat absorbing element 332 is an open pored material having a relatively high specific heat capacity, such as a metal or ceramic. One or more further outlets 333 can be present, for removal of cooled-down cleaning fluid and/or cooling fluid.

In other embodiments, the heat absorbing element 332 and/or the coolant storing element 331 are cooled not via the cooling water conduit 39 but by supplying cooling water through the hose 22, alternating with (hot) cleaning fluid. In a cooling phase, the cooling water, for example, cools both the heat absorbing element 332 and coolant storing element 331, with warmed up cooling water exiting through the outlet 333.

In embodiments, the heat absorbing element 332 includes a filter structure based on hard or elastic or soft foam or open pored structure. The structure may be made of a shape memory alloy or a shape memory polymer, causing the structure to have smaller pores and thus to be more resistant to a fluid flowing through it if the network is exposed to hot steam, and larger pores, being less resistant when the network is exposed to water, being cooler than steam.

The receptacle unit 33 can be supplied with cleaning fluid by an additional cleaning fluid conduit 38. Here too, the cleaning fluid can be steam, or water, or a mixture of steam with air and/or water, and optionally a cleaning agent and/or a foaming agent. The cleaning fluid can be guided to and applied directly to regions around nozzle outlets of the dispensing head 23.

A vibration generator 337 is arranged to impart vibrations, preferably in the ultrasound range, for cleaning a dispensing head 23 arranged in the receptacle unit 33.

If the dispensing head 23 includes an outer shell 233 and inner conduit 234, then it can include one or more vibration transmitters 237 for transmitting vibrations from the outer shell 233 to the inner conduit 234. The one or more vibration transmitters 237 are arranged to provide an efficient path, in particular a short path, from the vibration generator 337 to locations inside the inner conduit 234 where deposits are prone to accumulate. A vibration transmitter 237 can be a bridge, bar or link of material connecting the outer shell 233 and inner conduit 234.

A controller 100 of the cleaning unit 3 is arranged to read values of sensors, such as for temperature, flow and the presence detector 336, and to control the actuators such as valves and mixers to perform cleaning cycles, and to communicate with the connection unit 21. The cleaning unit 3 is configured to supply (hot) cleaning fluid, in particular including steam, to the dispensing head 23 only if it is arranged in the receptacle unit 33.

In embodiments, the cleaning unit 3 is configured to perform a reverse cleaning cycle in which cleaning fluid provided by the additional cleaning fluid conduit 38 flows through the dispensing head 23 and the hose 22 to the cleaning attachment unit 31 and through a further outlet conduit (not illustrated) out of the cleaning attachment unit 31. A valve controlling flow of water from the water mixer 20 into the connection unit 21 is closed, and an additional valve is arranged for guiding the reverse flow out of the cleaning attachment unit 31 through the further outlet conduit.

The cleaning unit 3 can be transported together to multiple places of use, for cleaning different dispensing units 2. The elements shown in FIG. 1 to be part of the cleaning unit 3, if they are present, can be arranged in a common housing, indicated by a dashed line. The housing typically forms a compact unit that can be carried or rolled to a place of use. The cleaning attachment unit 31 can be detachable from the housing, remaining connected to the other elements by the respective conduits, if present, so that the cleaning attachment unit 31 can be moved to and connected to the connection unit 21. The receptacle unit 33 can be integrated in the housing, but accessible from the outside, so that the dispensing head 23 can be placed in it. In other embodiments, the receptacle unit 33 is outside of the housing. In this case the receptacle unit 33 can be connected to the housing through one or more of the additional cleaning fluid conduit 38, cooling water conduit 39 and outlet 333.

FIG. 3 shows details of a connection unit 21 of the dispensing unit and a cleaning attachment unit 31 of the cleaning unit. They are shown in a position in which they can be engaged by moving them against one another in the horizontal direction. The connection unit 21 includes a mixing unit 211, in this case a mixing cartridge with one degree of freedom, for controlling the relative amount of water W from the water mixer 20 and a cleaning mixture CM provided by the cleaning attachment unit 31. This is done via a cleaning mixture conduit of the cleaning attachment unit 31 being plugged into a cleaning mixture conduit of the connection unit 21 (or vice versa) when the two units are engaged. The output of the mixing unit 211 is the cleaning fluid CF provided to the conduit of hose 22. The relative amount is controlled by a rotation of the mixing unit 211, which is effected by a gear wheel meshing with a gear wheel of the cleaning attachment unit 31, which in turn is driven by a first drive motor 311*a*. This illustrates the principle of the force transmission, in other embodiments such a detachable coupling of the force transmission to the connection unit 21 is implemented by other mechanical interfaces.

In embodiments, not illustrated, the mixing unit 211 has a second degree of freedom in which the total amount of water and cleaning mixture can be controlled. Correspondingly, a second drive motor 311*b* is arranged in the cleaning attachment unit 31 and is detachably coupled to the connection unit 21 for driving movement of the cartridge in a radial direction.

Figure 4:
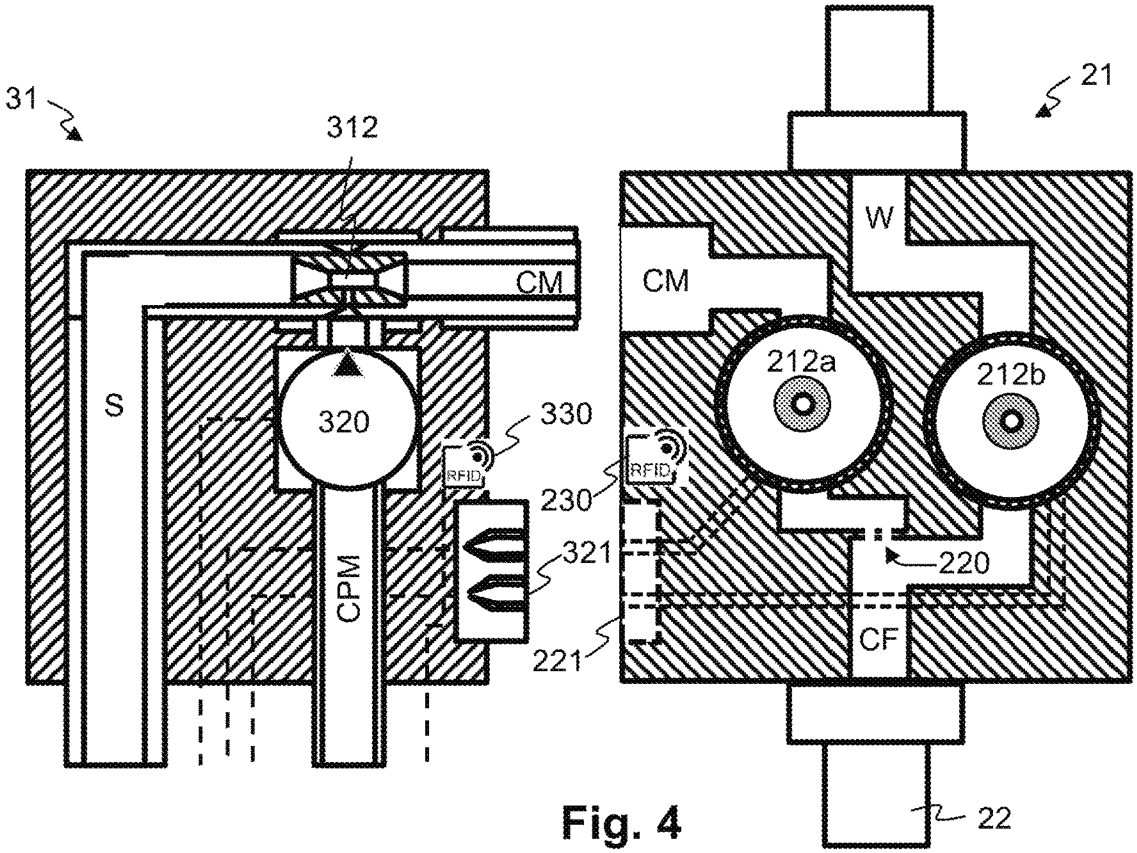
FIG. 4-5 details of another connection unit and another cleaning attachment unit.

FIG. 4 shows mixing valves instead of the mixing unit 211. Their operation is electrically or mechanically controlled by the cleaning attachment unit 31 via a corresponding interface.

With reference again to FIG. 3, the connection unit 21 includes a RFID tag 230 arranged to be read out by an RFID detector 330 of the cleaning attachment unit 31. This allows to identify the connection unit 21 and thus for data to be transmitted and stored in association with the connection unit 21. Such data can be cleaning data related to cleaning operations performed by the cleaning unit 3, or usage data collected by the dispensing unit 2 during its normal operation and transmitted from the connection unit 21 to the cleaning attachment unit 31. For the collection of such data, the connection unit 21 and cleaning attachment unit 31 include alternative or further means for wireless or optical communication (not illustrated). Communication can be bi-directional, and the connection unit 21 can be configured to receive data, such as operating parameters, from the cleaning attachment unit 31, to be used in normal operation of the dispensing unit 2. Such data can include cleaning data, generated by the cleaning unit 3 and stored in the dispensing unit 2. Such data can include at least a date at which the dispensing unit 2 was last cleaned.

In the cleaning attachment unit 31, the cleaning mixture CM is created by admixing a cleaning pre-mixture CPM to a flow of steam S by means of a venturi injector 312. The steam supply is controlled by a safety shutoff valve 319. The cleaning pre-mixture CPM is created in a mixing chamber 313. The mixing chamber 313 is separated from the venturi injector 312 by a check valve 315. The mixing chamber 313 is supplied with cleaning water CW supplied via a water control valve 316, and air A supplied via an air inlet valve 318 or an air inlet pump 40. The air inlet valve 318 can be an active, controlled valve or a passive, throttle valve. In the latter case, the air A is sucked in due to the pressure drop created in the venturi injector 312. Instead of the water control valve 316, a water pump 317 can be present, in particular a positive displacement pump. The cleaning water CW can be a mixture of water W and cleaning agent CA created in an additive mixer 314. Depending on the pressure condition under which the device operates, it may be the case that the pressure drop in the venturi injector 312 is not sufficient to suck in the cleaning pre-mixture CPM. In this case, a further pump or cleaning pre-mixture pump 320 (see FIG. 4), in particular a volumetric pump, such as a peristaltic pump, can be provided to deliver the cleaning pre-mixture to the venturi injector 312.

In embodiments, the cleaning pre-mixture pump 320 is arranged in the cleaning fluid delivery unit 32 instead of the cleaning attachment unit 31. In this case a check valve 315 can be arranged in the cleaning attachment unit 31, taking the place of the cleaning pre-mixture pump 320 shown in FIG. 4. The cleaning pre-mixture, typically including air A, cleaning agent CA and water W, thus is created in the cleaning fluid delivery unit 32, and from there is delivered by the cleaning pre-mixture pump 320 through the conduit 34 to the cleaning attachment unit 31.

In embodiments, a further pump is present after the venturi injector 312, for pumping the cleaning mixture CM.

FIG. 3 shows control lines for the different controlled valves, a power supply for the first drive motor 311*a*, and a communication line for the RFID detector 330. All of these typically are connected to the controller 100.

FIG. 4 shows details of further embodiments of the connection unit 21 and of the cleaning attachment unit 31. The cleaning attachment unit 31 shows only the venturi injector 312 and a cleaning pre-mixture pump 320. However, elements of the cleaning attachment unit 31 shown in FIG. 3 can be present, in addition to or instead of the pre-mixture pump 320.

The connection unit 21 includes mixing valves 212, a first mixing valve 212*a* for the cleaning mixture CM, and a second mixing valve 212*b* for the water W. The mixing valves 212 include an electrical valve drive each, allowing proportional control of the flow through the respective valve. The valve drives are powered and controlled by electrical lines that are connected through an electrical connector 221 of the connection unit 21 to an electrical connector 321 of the cleaning attachment unit 31. In other embodiments, not illustrated, the valve drives are located in the cleaning attachment unit 31, and the mixing valves 212 are driven through detachable mechanical drive couplings between the cleaning attachment unit 31 and connection unit 21.

In both the electrically and mechanically driven variants of the mixing valve 212, the preferably each include a biasing mechanism, such as a spring. The biasing mechanism is configured to move the first mixing valve 212*a* (for the cleaning mixture CM) to a closed position and the second mixing valve 212*b* (for the water W) to an open position when the connection unit 21 is disconnected from the cleaning attachment unit 31, or when the cleaning attachment unit 31 is not powered.

The cleaning mixture CM, which typically is based on steam, is injected into the water conduit through one or more injection openings 220. The resulting cleaning fluid CF is provided to the hose 22, or to further devices 22' if present.

In embodiments, the first mixing valve 212*a* is not an externally controlled valve, that is, an electrically or mechanically controlled valve. Rather it is replaced by a check valve. In this case, the delivery of the cleaning mixture CM to the flow of water W is controlled by an alternative first mixing valve arranged in the cleaning attachment unit 31 or in the cleaning fluid delivery unit 32. This simplifies the construction and control of the connection unit 21.

Figure 5:
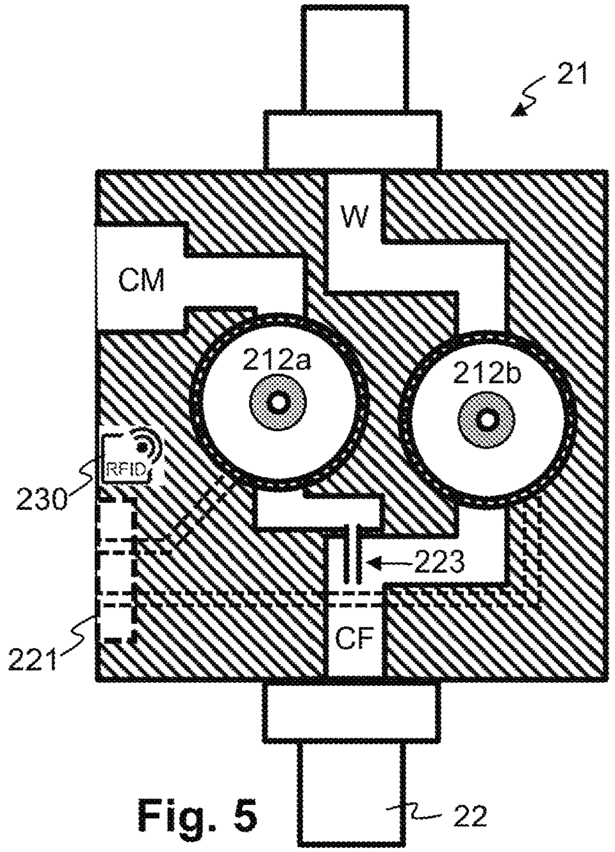

FIG. 5 shows a variation of the connection unit 21 in which the injection openings are realised in the shape of an injection conduit 223 extending into the water conduit. In this way cleaning mixture based on steam can be injected into the centre of the flow of water, providing a thorough mixing of steam and water.

The two mixing valves 212 can have different flow characteristics since one of them controls the flow of water and the other one—depending on the operating mode—controls the flow of steam.

The connection unit 21 and cleaning attachment unit 31 are designed to be coupled and decoupled without the need for tools. The elements related to the coupling, in particular the pluggable cleaning mixture (CM) conduits, the RFID tag 230 and RFID detector 330 or other near-field communication means, and the electrical or mechanical interfaces for driving the mixing unit 211 or mixing valves 212 are considered to be interface elements.

In embodiments in which elements of the connection unit 21 and cleaning attachment unit 31 are designed to be in a permanently connected arrangement, the interface elements are not present.

Figure 6:
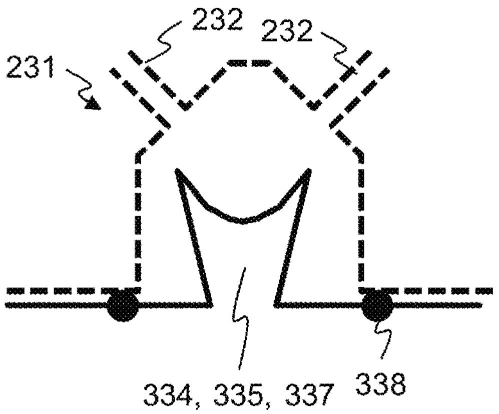
FIG. 6 a detail of a receptacle unit.

FIG. 6 shows a detail of the receptacle unit 33. The outline of an outlet cartridge 231 of the dispensing head 23 is shown with dashed lines. It shows two nozzles 232 for creating colliding jets of water for generating a spray in the normal use of the dispensing head 23 for showering or washing. Regions around the outlets of the nozzles 232 are prone to accumulation of limescale, which can impede optimal operation of the nozzles. The receptacle unit 33, in locations facing the inside of such outlet cartridges 231, can include elements for cleaning these regions. Such elements, not illustrated in detail, can be:

- guiding elements 334 that guide the spray from the nozzles 232 to clean the regions around the nozzle outlets;

cleaning elements 335 such as brushes, or nozzles spraying cleaning fluid supplied by the additional cleaning fluid conduit 38;

vibration generators 337.

Gaskets 338 are arranged to keep cleaning fluid from the dispensing head 23 or the additional cleaning fluid conduit 38 from reaching and damaging the outer surface of the dispensing head 23.

In a minimal configuration, the cleaning attachment unit 31 is provided only with cleaning fluid, typically steam, from the cleaning fluid delivery unit 32. The receptacle unit 33 is provided with cooling water through the hose 22 and dispensing head 23, alternating with hot cleaning fluid.

Figure 7:
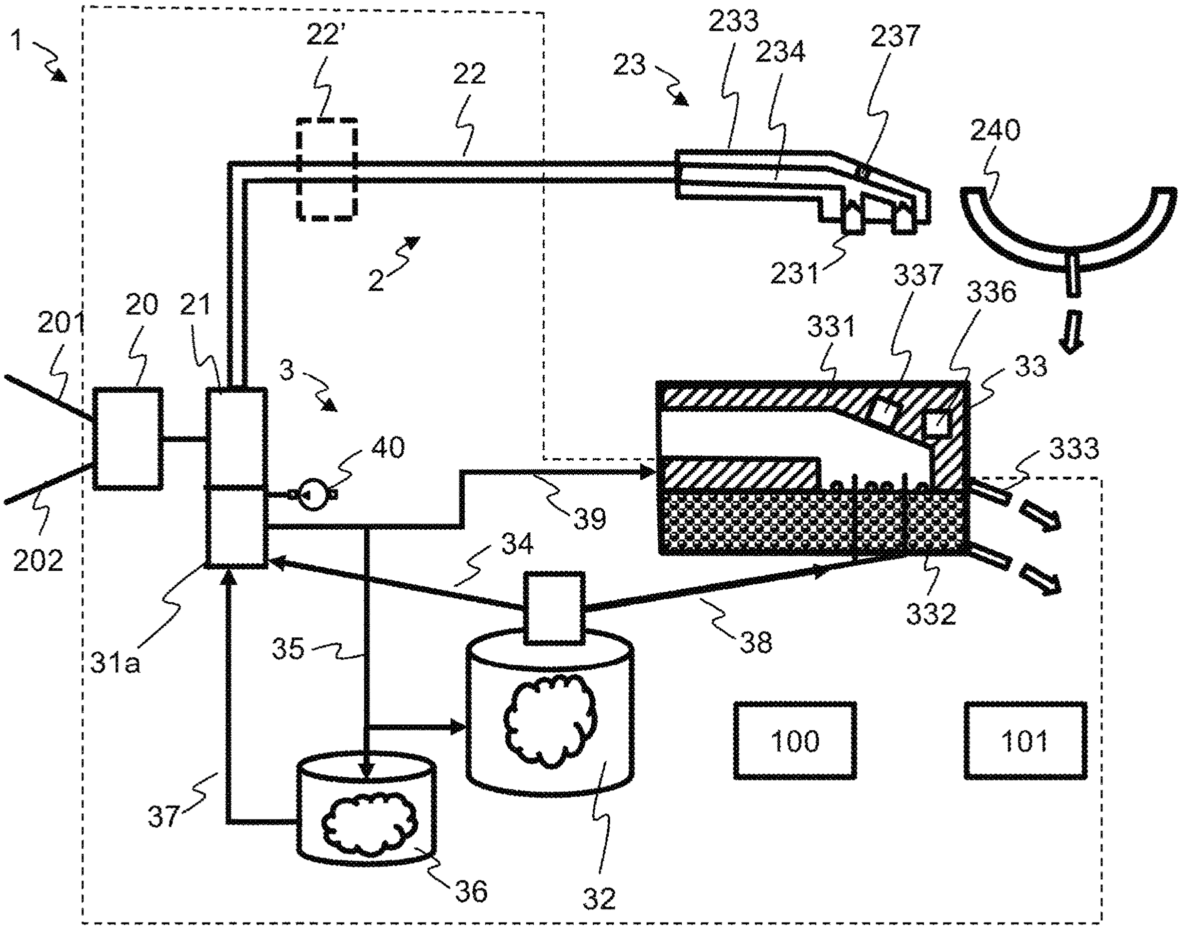
FIG. 7 an integrated configuration of the dispensing unit and cleaning unit.

In an integrated configuration, the dispensing unit 2 and cleaning unit 3 are integrated units of the dispensing system 1. That is, the connection unit 21 and cleaning attachment unit 31 are not separate, but their functionality is implemented by a single, common unit. This unit can be also integrated with the water mixer 20. Interface elements for coupling the connection unit 21 to the cleaning attachment unit 31 are not required. The elements of the cleaning attachment unit 31 presented so far, without the interface elements, are considered to constitute a cleaning mixture preparation unit 31*a*. FIG. 7 shows a possible structure of such an integrated configuration. The elements enclosed in the dashed line, if they are present, are arranged in a common housing, typically a compact housing. The receptacle unit 33 can be integrated in the housing, but accessible from the outside, so that the dispensing head 23 can be placed in it. In other embodiments, the receptacle unit 33 is outside of the housing. In this case the receptacle unit 33 can be connected to the housing through one or more of the additional cleaning fluid conduit 38, cooling water conduit 39 and outlet 333. In other embodiments, the receptacle unit 33 is not present at all. The dispensing system 1 can include or be attached to a sink 240 with an outlet.

This configuration can be, for example, used for professional hairdressing applications. In this case, the further devices 22' can be configured for admixing hair care, colouring or cosmetic agents. Other applications are dental operatory packages, in which liquids are delivered for application to a patient, and conduits and hoses are prone to fouling.

Such an integrated configuration is particularly suited for controlling the temperature of the liquid being dispensed by admixing steam. In this way it is possible control the temperature with a high bandwidth and reliably to a set point temperature. This in turn simplifies use of the dispensing system 1. For example, in a hairdressing application, the controller 100 can control the temperature of water dispensed for hair treatment or rinsing without the user needing to manually regulate the temperature.

Such an integrated configuration is particularly suited for using the dispensing unit 2 to clean other objects that are part of or are used with of the dispensing system. Such objects can be the sink 240, and accessory devices, such as combs, brushes, etc. The cleaning can include applying steam to sterilise the objects. In an operating mode in which such cleaning of other objects takes place, the dispensing system 1 is configured to emit a warning signal.

In a setting for treatment of humans, such as in hairdressing or in a dental operatory package, the dispensing system 1 can be configured to detect the presence of a client in a treatment location, such as a seat associated with the dispensing system 1, and inhibit operation in a cleaning mode in which harmful temperatures or substances are present. This can be done with a presence detecting unit 101, for example installed in a seat. Such units are known from automobile applications, for detecting the presence of passengers.

Thanks to the warning signal and/or client presence detection the dispensing unit 2 and in particular the dispensing head 23 can be safely used on the one hand for applying fluids to a human client and on the other hand for cleaning the dispensing system 1 and other objects. In embodiments, a further safety function can ensure that the dispensing head 23 is only used if the operator is identified as being trained for using the system in such a cleaning mode. For example, this can be done with an RFID tag or by entering a code.

In a method for operating the dispensing system 1, maintenance operations are performed for maintaining the dispensing unit 2, in particular the hose 22, the dispensing head 23 and, if present, further devices 22'. Maintenance operations can be one or more of the following:

Sterilising the dispensing unit 2. This can include providing steam to the dispensing unit 2.

Decalcifying the dispensing unit 2. This can include providing a decalcifying agent to the dispensing unit 2 and then rinsing it with water. It can include alternatingly providing steam and cold water to the dispensing unit 2.

Preventive treatment of the dispensing unit 2. This can include, in a final cycle of a maintenance operation, providing to the dispensing unit 2 a treatment agent for preventing or reducing future accumulation of deposits in the dispensing unit 2. The treatment agent can be a fluid that inhibits the accumulation of limescale and/or fouling, in particular by a biofilm. Since limescale forms a substrate for bacterial growth, inhibiting the growth of limescale indirectly inhibits bacterial growth. The treatment agent can be chosen to remain attached on inside surfaces of the dispensing unit 2. Such a fluid can include agents that mechanically or chemically inhibit growth of a biofilm. Such a fluid can itself include beneficial microorganisms that attach to the inside surfaces and inhibit the growth of undesired microorganisms. In embodiments, the fluid is an essential oil.

These maintenance operations can be performed repeatedly and alternating. For multiple sterilising and decalcifying operations can be performed alternating, followed by a final treatment operation. A maintenance program defining such a sequence of operations can be adapted according to the construction of the dispensing unit 2 to be cleaned and the environment in which the dispensing unit 2 is used. The environment can be defined by quality requirements, depending on the dispensing unit 2 being in as hotel, kitchen, private household, etc, and/or by environmental factors such as the chalkiness of the water, ambient temperature.

Maintenance operations can be controlled by the controller 100 controlling operation of the various valves and motors of the dispensing system 1, in particular of the connection unit 21 and cleaning attachment unit 31.

The methods implementing maintenance operations are applicable to embodiments in which the dispensing unit 2 and cleaning unit 3 are separate and are connected before performing the methods, and also applicable to embodiments in which the dispensing unit 2 and cleaning unit 3 are integrated units of the dispensing system 1. In this case, elements that so far have been shown to be part of separate units such as the connection unit 21 and the cleaning attachment unit 31 can be in a common, integrated unit.

The controller 100 can, depending on a log of maintenance operations and on the current time or date, control which kind of maintenance operation is to be implemented. For example, sterilisation can be performed each day, whereas decalcification and/or preventive treatment can be performed at larger intervals, for example, weekly, or every tenth or twentieth time that the cleaning unit 3 is applied.

In a method for creating a mixture of a liquid, in particular water, with an additive, the additive is provided as a component of the cleaning mixture CM. The cleaning mixture CM thus includes a flow of steam with the additive carried along with the steam, the additive being in a gaseous state. When the cleaning mixture condenses, either prior to or after being injected into the flow of water, the condensing mixture of steam and (vaporised) additive can create microscopic particles or droplets of additive encapsulated in the liquid. Due to the massive reduction of volume from the gaseous to the liquid state, for example, by a factor of one thousand, the droplets of additive are very small. Normally, a buoyant force, caused by a difference in specific weight, would cause the additive to separate from the water. However, with such very small droplet sizes, the buoyant force acting on the droplets is sufficiently counteracted by the surface tension of the water so as to inhibit the droplets to separate from the water. The microscopic droplets thus remain in the flow of water to which the steam is admixed, forming an emulsion. The emulsion thus is sufficiently stable and there is no need for emulsifying agents. This is especially the case if the emulsion is used immediately after having been created at the point of use—as opposed to storing it for later use. The emulsion is applied to a surface, for example, for cosmetic or medical or generally other purposes.

Suitable additives are, for example, essential oils, also known as volatile oils, ethereal oils, or aetherolea. Such oils contain volatile components, in particular components extracted by steam extraction.

In this way it is possible to very finely distribute an additive in the water, which in turn allows to use highly concentrated additives. This approach can be used for other applications in which the mixture that here is called cleaning mixture CM for the sake of consistency is used for purposes other than cleaning.

While the invention has been described in present embodiments, it is distinctly understood that the invention is not limited thereto, but may be otherwise variously embodied and practised within the scope of the claims.

The invention claimed is:

1. A dispensing system for dispensing a fluid, the fluid being water or a water-based mixture, the system comprising a dispensing unit and a cleaning unit, the dispensing unit comprising:

a connection unit for connecting the dispensing unit to a supply of the fluid, a dispensing head for dispensing the fluid;

a conduit for guiding the fluid from the connection unit to the dispensing head;

wherein the cleaning unit comprises:

a cleaning mixture preparation unit for providing a cleaning mixture to the connection unit;

a cleaning fluid delivery unit configured to deliver cleaning fluid to the dispensing unit via a cleaning attachment unit;

a receptacle unit configured to accommodate the dispensing head and to receive fluids exiting the dispensing head;

means, comprising a steam generation unit, for providing the cleaning fluid to the conduit, the cleaning fluid comprising steam or water or air or a mixture of two or more of steam and air and water and a cleaning agent;

the dispensing system comprising a mixing unit or mixing valves for selecting from a flow of water from a water supply or from a flow of cleaning mixture, and/or for mixing the flow of water with the flow of cleaning mixture, and wherein the mixing unit or mixing valves are part of the connection unit, or wherein the mixing unit or mixing valves are part of the cleaning attachment unit and water from a water mixer is guided from the connection unit into the cleaning attachment unit, and wherein the cleaning unit comprises, for providing the cleaning mixture, a second mixer, said second mixer being a venturi injector, for admixing a cleaning pre-mix to a flow of steam, thereby creating the cleaning mixture, and wherein the cleaning unit comprises, for providing the cleaning pre-mix, a third mixer, said third mixer being a mixing chamber, for admixing air to a flow of cleaning water, thereby creating the cleaning pre-mix, and wherein the cleaning unit comprises, for providing the flow of cleaning water, a fourth mixer, said fourth mixer being an additive mixer, for admixing a cleaning agent to a flow of water, thereby creating the cleaning water.

2. The dispensing system of claim 1, wherein a control valve or a water pump is arranged to provide the cleaning water to the mixing chamber.

3. The dispensing system of claim 1, wherein a water pump is arranged to provide the cleaning water to the mixing chamber, the water pump being a positive displacement pump.

4. The dispensing system of claim 1, wherein a controlled valve or a static valve is arranged to provide air to the mixing chamber.

* * * * *